United States Patent
Dugenske

(10) Patent No.: US 12,382,547 B1
(45) Date of Patent: *Aug. 5, 2025

(54) TWO WAY PORTABLE EMERGENCY COMMUNICATOR DEVICE, SYSTEM AND METHOD

(71) Applicant: HD Group Enterprises LLC, St. Petersburg, FL (US)

(72) Inventor: Darin Dugenske, St. Petersburg, FL (US)

(73) Assignee: HD Group Enterprises LLC, St. Petersburg, FL (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/211,431

(22) Filed: Jun. 19, 2023

Related U.S. Application Data

(63) Continuation-in-part of application No. 17/527,797, filed on Nov. 16, 2021, now Pat. No. 11,682,291.

(60) Provisional application No. 63/114,598, filed on Nov. 17, 2020.

(51) Int. Cl.
| | |
|---|---|
| *G08B 1/08* | (2006.01) |
| *H04W 4/60* | (2018.01) |
| *H04W 8/18* | (2009.01) |
| *H04W 76/50* | (2018.01) |

(52) U.S. Cl.
CPC ............ *H04W 76/50* (2018.02); *H04W 4/60* (2018.02); *H04W 8/183* (2013.01)

(58) Field of Classification Search
CPC ........ H04W 76/50; H04W 4/60; H04W 8/183
USPC ...................................................... 340/539.1
See application file for complete search history.

(56) References Cited

U.S. PATENT DOCUMENTS

| | | | |
|---|---|---|---|
| 4,587,516 A | 5/1986 | Hiraki | |
| 5,305,370 A | 4/1994 | Kearns | |
| 5,838,237 A * | 11/1998 | Revell ................ | G08B 25/016 |
| | | | 340/456 |
| 8,106,820 B2 | 1/2012 | Bennett et al. | |
| 8,264,540 B2 | 9/2012 | Chang et al. | |
| 8,359,000 B2 | 1/2013 | Fee | |
| 8,373,658 B2 | 2/2013 | Ye et al. | |
| 8,408,041 B2 | 4/2013 | Ten Kate et al. | |
| 10,147,304 B1 * | 12/2018 | Lazarski ............ | G08B 21/0269 |
| 11,611,648 B2 | 3/2023 | Kutscher | |
| 2003/0012344 A1 | 1/2003 | Agarwal | |
| 2003/0034881 A1 | 2/2003 | Linnett | |
| 2009/0040053 A1 | 2/2009 | White | |

(Continued)

FOREIGN PATENT DOCUMENTS

| | | |
|---|---|---|
| CN | 202816096 U | 3/2013 |
| CN | 204390454 U | 6/2015 |

(Continued)

*Primary Examiner* — Tai T Nguyen
(74) *Attorney, Agent, or Firm* — Brian S. Steinberger; Hilary F. Steinberger; Steinberger IP Law

(57) ABSTRACT

Devices, systems and methods for providing a two-way portable and wearable emergency communicator for allowing users capability to with a press of a button/switch to contact a local 911 dispatch operator instantly without going through a subscriber network and also provide GPS (global positioning system) data to the 911 dispatch operator. The devices can directly and instantly contact local 911 emergency contact numbers. With the press of a button GPS coordinates of the device can also be sent as text messages to the local 911 emergency contact.

3 Claims, 16 Drawing Sheets

(56) References Cited

U.S. PATENT DOCUMENTS

| | | |
|---|---|---|
| 2009/0233573 A1 | 9/2009 | Gray |
| 2011/0319048 A1* | 12/2011 | Matlock ............... G08B 25/006 |
| | | 340/539.11 |
| 2012/0286949 A1 | 11/2012 | Worthington et al. |
| 2013/0082837 A1* | 4/2013 | Cosentino ............ G08B 25/016 |
| | | 340/539.12 |
| 2013/0271277 A1 | 10/2013 | McCauley |
| 2014/0368601 A1 | 12/2014 | deCharms |
| 2015/0319520 A1* | 11/2015 | Richardson ............ H05K 5/069 |
| | | 381/384 |
| 2017/0215033 A1 | 7/2017 | Piraino et al. |
| 2018/0027103 A1 | 1/2018 | Chacon |
| 2019/0099114 A1* | 4/2019 | Mouradian ............ A61B 5/681 |
| 2019/0213860 A1 | 7/2019 | Shaprio |
| 2019/0287383 A1 | 9/2019 | Quick |
| 2020/0135005 A1* | 4/2020 | Katz ................... H04M 7/0021 |
| 2021/0392222 A1* | 12/2021 | Kutscher ........... H04M 1/72418 |
| 2022/0117558 A1* | 4/2022 | Nicolae ................ A61B 5/6804 |

FOREIGN PATENT DOCUMENTS

| | | |
|---|---|---|
| CN | 205621234 U | 10/2016 |
| CN | 207123723 U | 3/2018 |
| CN | 108209884 A | 6/2018 |
| CN | 111194977 A | 5/2020 |
| ES | 1200661 U | 12/2017 |
| GB | 2518658 A | 4/2015 |
| WO | 2008120917 A1 | 10/2008 |

\* cited by examiner

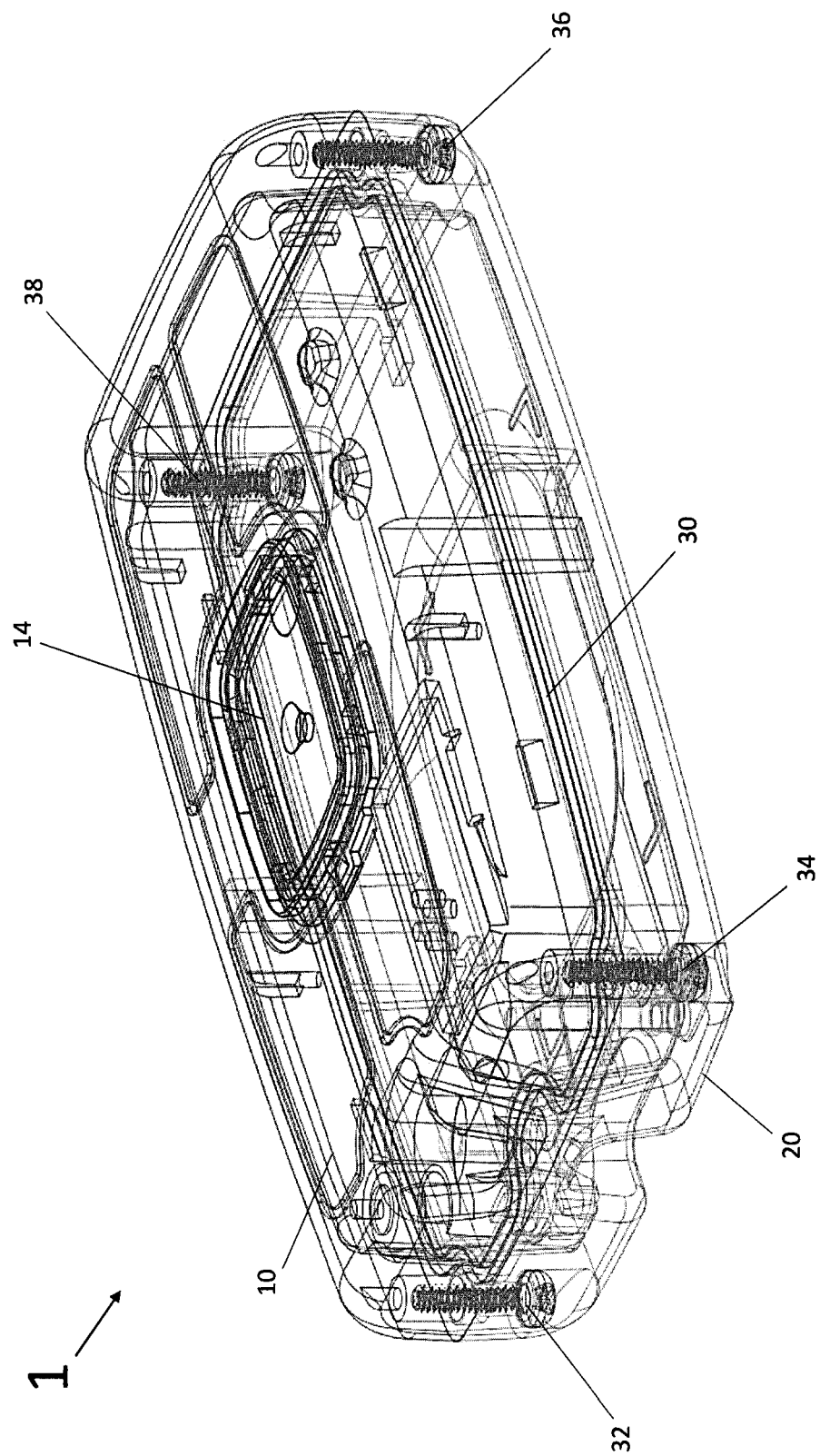

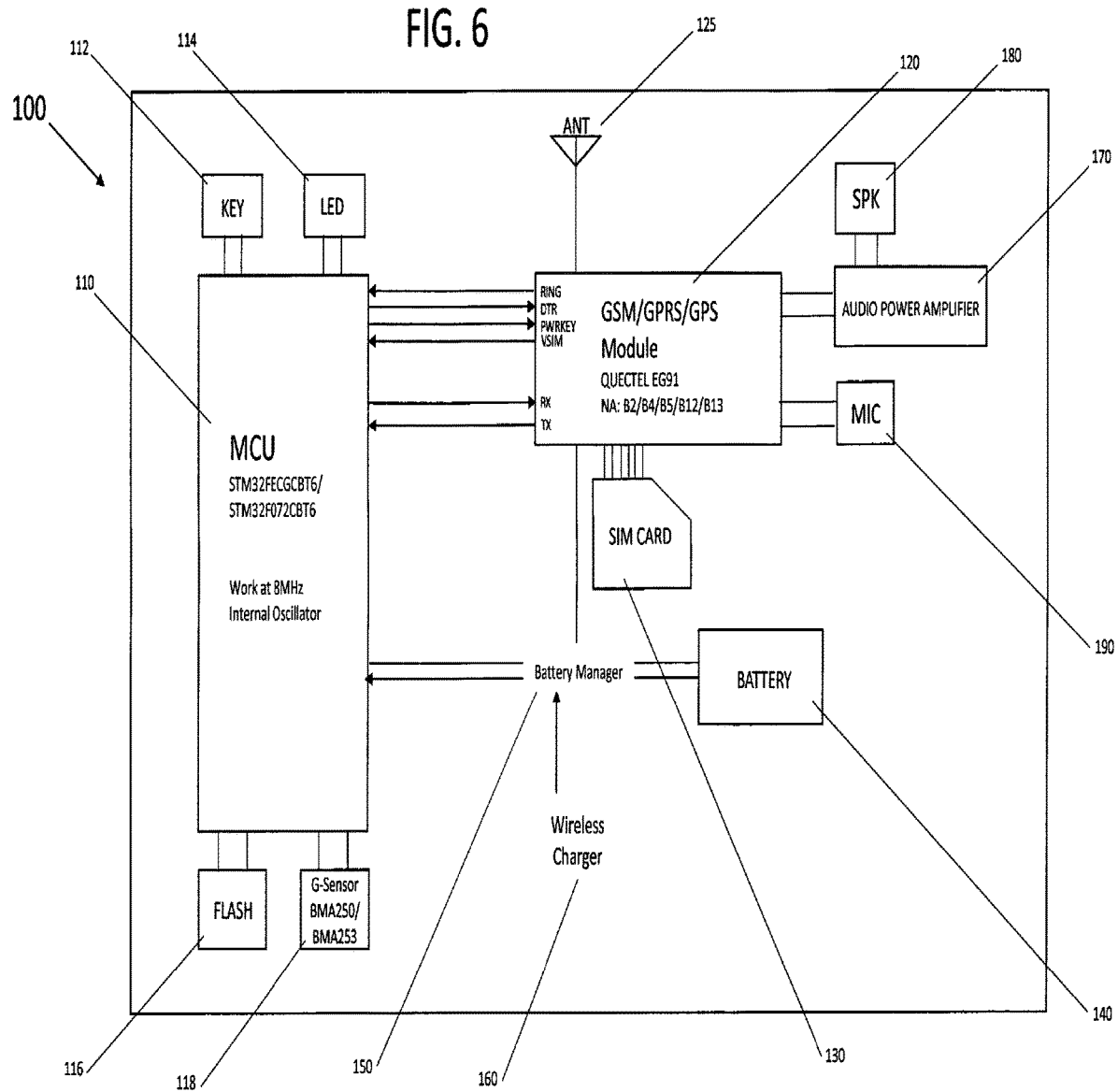

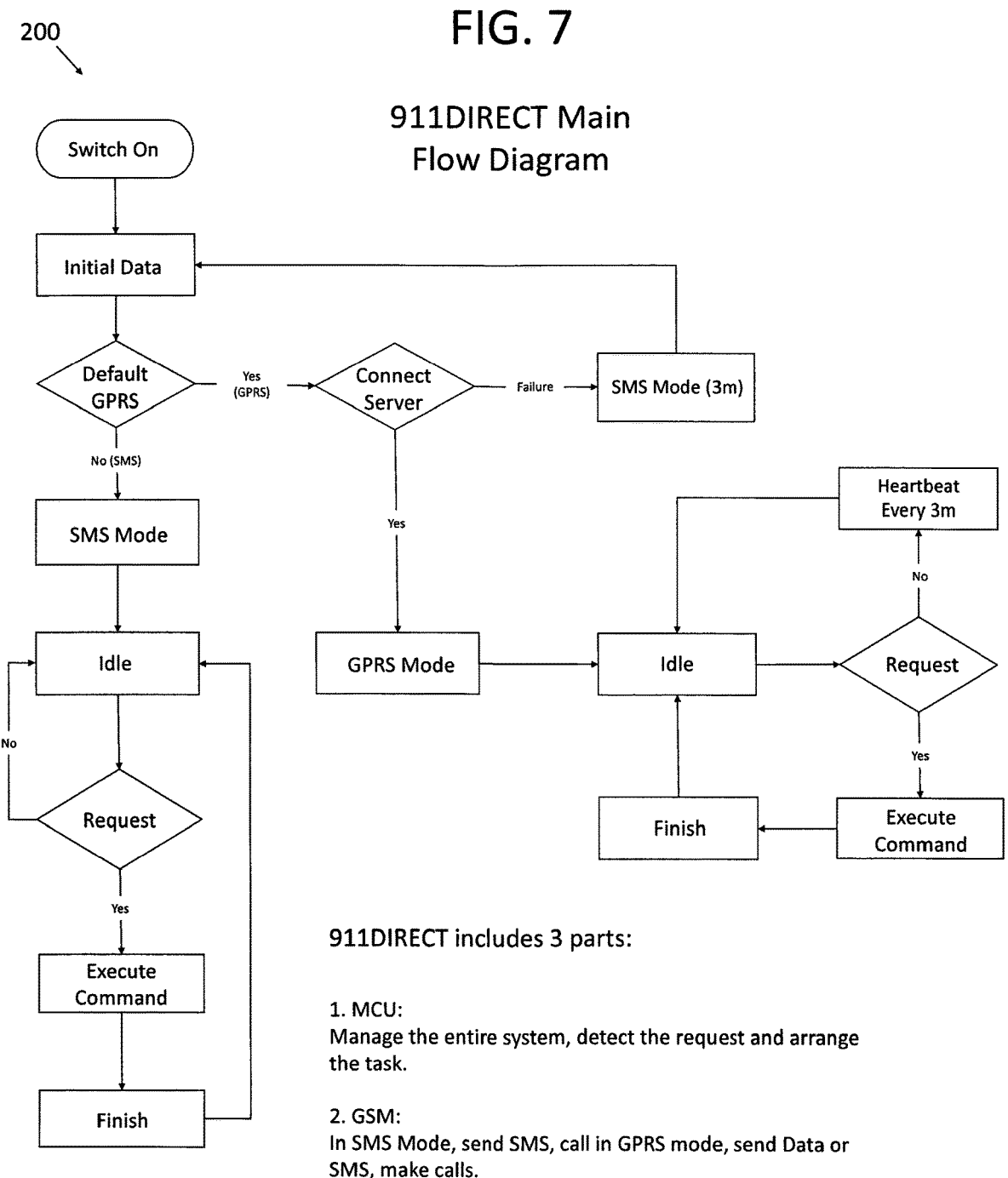

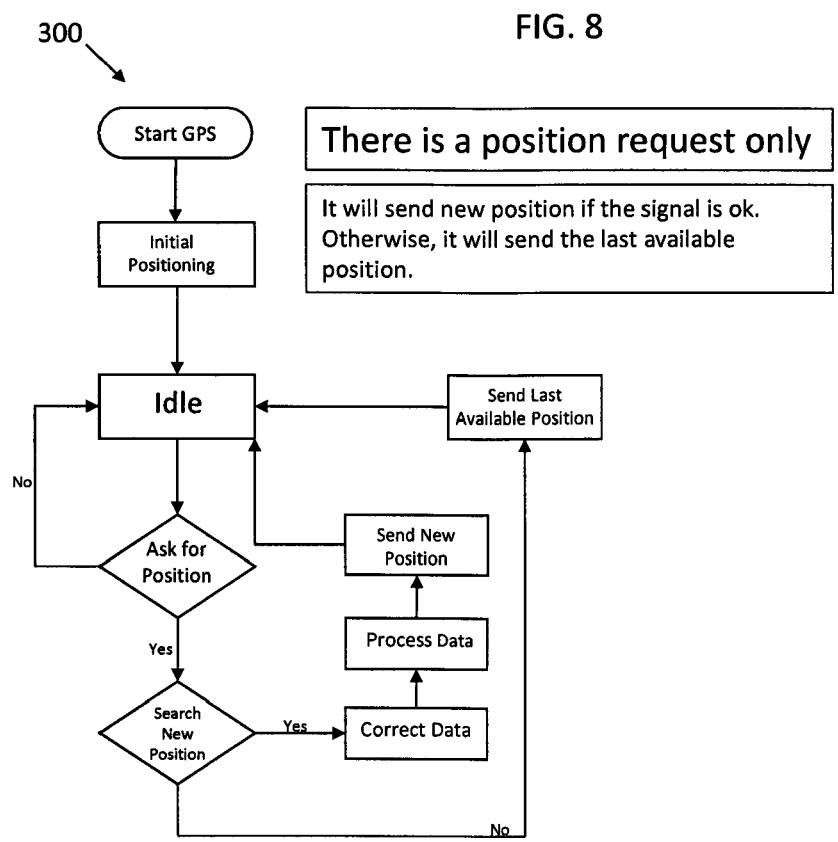

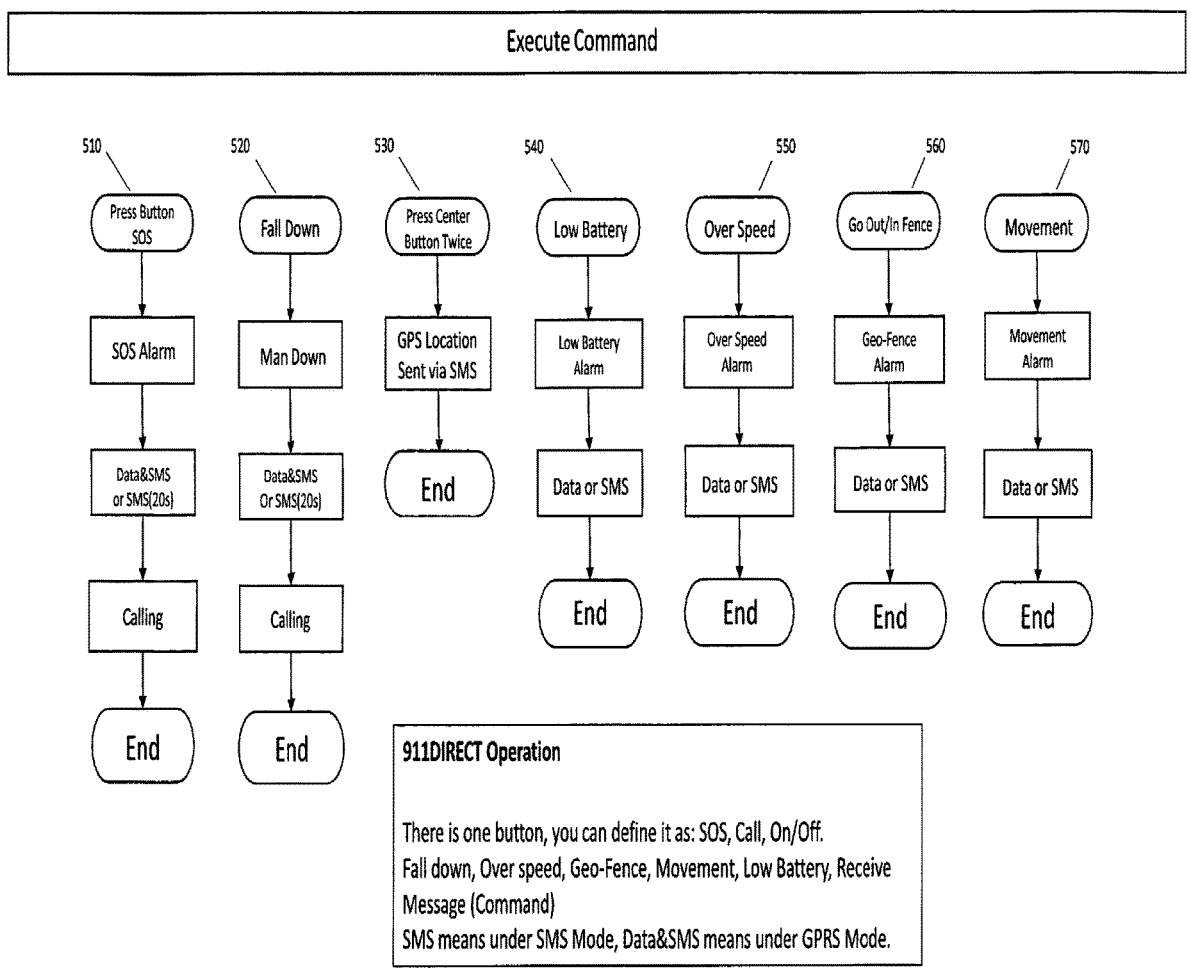

TWO WAY PORTABLE EMERGENCY COMMUNICATOR DEVICE, SYSTEM AND METHOD

CROSS REFERENCE TO RELATED APPLICATION

This application is a Continuation In Part (CIP) of U.S. patent application Ser. No. 17/527,797 filed Nov. 16, 2021, now U.S. Pat. No. 11,682,291 issued Jun. 20, 2023, which claims the benefit of priority to U.S. Provisional Application Ser. No. 63/114,598 filed Nov. 17, 2020, which is incorporated herein by specific reference thereto.

FIELD OF INVENTION

This invention relates to emergency communications, and in particular to devices, systems and methods for providing a two way portable emergency communicator for allowing users capability to with a press of a button/switch to contact a local 911 dispatch operator instantly without going through a subscriber network and also provide GPS (global positioning system) data to the 911 dispatch operator.

BACKGROUND AND PRIOR ART

Emergency communication devices have become popular over recent years. LIFE ALERT® by Life Alert Emergency Response, Inc., a California company is an audio monitoring system that allows users to contact their private company monitoring service. The private company monitoring service has security dispatchers that can hear audio from the sender in many cases utilizing a home phone line or base unit attached to land line and in some cases without needing a home phone. The call is routed from the home land line to a security dispatcher at the private company monitoring service can then separately contact law enforcement.

In addition, this monitoring service requires regular subscriber fees, such as monthly fees from the users to be used.

Other private company monitoring services can offer similar services.

A basic problem is that the private company security dispatchers must separately contact law enforcement for the emergency, which means there are delays to when law enforcement in contacted. Delays of even seconds can have detrimental effects.

Additional problems include the services require subscription services that can mean regular fees, such as continuous monthly monitoring fees which can be expensive and out of reach of people living on fixed limited incomes, and the like.

The subscription fees can require additional services, for additions to the basic services, such as use of cell phones and the like. See for example Alert1® from AlertOne Services LLC of Williamsport, PA, Lively™ mobile+ and Lively Wearable2 from Lively of San Diego, CA.

There are other providers that are using outdated technology using the emergency band, 2G or 3G technology that cellular carriers and towers no longer support or maintain. Thus, meaning the technology is not supported and becoming obsolete leaving any user with questionable to nonfunction able services. As this continues the users will have limited to no access to emergency service operators.

There are also devices which must be connected to another cellular device that provide certain features. The limitations are you must have an existing cellular plan with another device, the cellular device would connect to your emergency device via Bluetooth. This causes issues as you are dependent on another cellular device with an active cellular plan, must have constant Bluetooth connectivity, which means you are using multiple devices to protect you.

U.S. Pat. No. 6,11,648 to Kutscher et al. describes a "Method and Apparatus for Contacting Emergency Services", title, and claims the requirement of a "video signal" being communicated between the user and an emergency provider in both their independent claims 1 and 9, which appears to provide a live video feed. These limitations would require the use of both a camera in their device and camera for the emergency provider, which creates extra costs and limitations to be used.

The Kutscher '648 patent does not reference using a SIM (Subscriber Identity Module) card, and does not include the use of 5G, 6G, nor satellite communications.

While the Kutscher '648 patent refers to "water-resistant or waterproof capabilities", there is no disclosure of their device being waterproof when submerged. their device does not cite any certifications that the device is capable of being waterproof up to approximately 1 meter underwater. There are NO known IP (Ingress Protection) certification ratings for the device in the Kutscher '648 patent.

The Kutscher '648 patent describes no capability for monitoring the user with an accelerometer, nor a gyroscope. For example, the Kutscher '648 patent describes no capability being used as a fall monitor with alarm for the user, nor for monitoring location for the user travelling out of a location, nor for monitoring any speed of the user driving over speed limits, and the like.

Thus, the need exists for solutions to the above problems with the prior art.

SUMMARY OF THE INVENTION

A primary objective of the present invention is to provide devices, systems and methods for providing instant two-way portable emergency communicator for users to directly contact local 911 emergency contact numbers without any delays.

A secondary objective of the present invention is to provide devices, systems and methods for providing a two-way portable emergency communicator for users, allowing users capability to with a press of a button/switch to contact a local 911 dispatch operator instantly without going through a subscriber network and also provide GPS (global positioning system) data to the 911 dispatch operator.

A third objective of the present invention is to provide devices, systems and methods for providing a two-way portable emergency communicator for users, directly contact local 911 emergency contact numbers 24 hours per day.

A fourth objective of the present invention is to provide devices, systems and methods for providing a two-way portable emergency communicator for users, directly contact local 911 emergency contact numbers without any subscriber fees, such as monthly fees to operate.

A fifth objective of the present invention is to provide devices, systems and methods for providing a two way portable emergency communicator for allowing users capability to with a press of a button/switch to contact a local 911 dispatch operator instantly without going through a subscriber network and also provide GPS (global positioning system) data to the 911 dispatch operator.

A sixth objective of the present invention is to provide devices, systems and methods for providing a two way portable emergency communicator for allowing the users to have the freedom to go anywhere (including traveling within the country) and have the peace of mind they are a push of a button away from a 911 dispatch operator.

A seventh objective of the present invention is to provide devices, systems and methods for providing a two way portable emergency communicator waterproof device protection allowing users the capabilities to enjoy bathing, swimming and/or to submerge the device without the fear of failing.

Our objective is to obtain a IPX67 rating or higher.

An eighth feature of the present invention is to provide devices, services and methods for providing a two way portable emergency communicator with rechargeable battery through either charging station or wireless charging to ensure the device is kept in a functional state.

A ninth feature of the present invention is to provide devices, services and methods for providing a two way portable communicator that in the event the wearer of the device shall fall the device will automatically contact a 911 emergency operator without the need to press the call button.

A tenth feature of the present invention is to provide devices, services and methods for providing a two way portable communicator that utilizes current SIM/IOT cards and services to provide the most comprehensive, immediate connection as well as GPS capabilities to a 911 emergency operator.

A preferred application of the device is as a wearable device.

A wearable device can include such as but not limited to being used worn as a watch or bracelet around the wrist, on a lanyard around the neck, on a belt clip, around the arm, around the leg and ankle, and the like.

The novel device can have a built-on loop that allows the device to be attached to a lanyard and the like, so the two-way device can be worn on a user's neck.

The device can have a wrist strap for allowing the device to be worn on the wrist of the user. Additionally, the device can be clipped on a belt, purse or another part of an apparel of the user.

The device allows for one touch of a button directly and instantly to a local 911 operator without any delays.

The SIM card, e-SIM and/or SIM module can be operable in at least 3G, 4G, 5G and 6G and/or satellite operation modes (Referred to as "SIM card" module).

The SIM card module can be operable with satellite communications.

The portable and wearable device can include an emergency number customize mode with subscription service, which allows the user to customize an emergency contact phone number, when using the subscription service The portable and wearable device can include a charging station having an opening for allowing the device to be inserted, and a USB port on the charging station for allowing attachment to a power source for recharging the battery.

The portable and wearable device can include a wireless charger for charging the battery to a wireless power source.

The actuation mode can include depressing the button for approximately 2 to approximately 3 seconds to automatically initiate a live two-way voice call with the local 911 operator.

The actuation mode can include depressing the button for approximately 2 to approximately 3 seconds to automatically initiate send a data and SMS message with GPS location coordinates to the local 911 operator.

The actuation mode can include depressing the button for approximately 2 to approximately 3 seconds to automatically initiate both initiate a live two-way voice call with the local 911 operator, and send a data and SMS message with GPS location coordinates to the local 911 operator.

The actuation mode can include an accelerometer or a gyroscope, which will automatically initiate a live two-way voice call with the local 911 operator if at least one of the device, and the user falls down from a height of approximately 0.5 m.

The actuation mode can include an accelerometer or a gyroscope, which will automatically initiate sending a data and SMS message with GPS location coordinates to the local 911 operator if at least one of the device, and the user falls down from a height of approximately 0.5 m.

The actuation mode can include actuation mode include an accelerometer or a gyroscope, which will automatically initiate both a live two-way voice call with the local 911 operator, and, send a data and SMS message with GPS location coordinates to the local 911 operator, if at least one of the device, and the user falls down from a height of approximately 0.5 m.

The actuation mode can include depressing the button for approximately 2-approximately 3 seconds to automatically initiate a live two-way voice call with the local 911 operator, followed by depressing the button twice in succession will automatically send a data and SMS message with GPS location coordinates to the local 911 operator.

The portable device can include another actuation mode to contact a third party by at least one of phone or text message, if at least one of the device, and the user is travelling over a selected speed.

The portable device can include another actuation mode to contact a third party by at least one of phone or text message, if at least one of the device, and the user is travels outside a selected zone.

A portable and wearable emergency communication device for a user, can include a handheld waterproof casing for allowing the device to be submersible up to approximately 1 meter underwater, a transmitter inside of the casing for contacting a local 911 operator, a single button switch on the casing activate the transmitter for contacting the local 911 operator, a SIM (Subscriber Identity Module) card module in the casing for storing an international mobile subscriber identity (MSI) number, the SIM card for communicating through a cellular or IOT (internet of things) network, a speaker in the casing for allowing the user to hear audio from the local 911 operator, a microphone in the casing for allowing the user to speak directly to the local 911 operator, a rechargeable battery in the casing for providing power to the transmitter, speaker and microphone, a GPS (global positioning satellite) module in the casing, an attachment opening in the casing to allow the device to be attached to one of: a lanyard, a belt clip, and garment clip, an accelerometer or gyroscope, to automatically initiate at least one of a live two-way voice call with a third party, and send a data and SMS text message with GPS location coordinates to the third party if the device is travelling over a selected speed.

A portable and wearable emergency communication device for a user, can include a handheld waterproof casing for allowing the device to be submersible up to approximately 1 meter underwater, a transmitter inside of the casing for contacting a local 911 operator, a single button switch on the casing activate the transmitter for contacting the local 911 operator, a SIM (Subscriber Identity Module) card module in the casing for storing an international mobile subscriber identity (MSI) number, the SIM card for communicating through a cellular or IOT (internet of things) network, a speaker in the casing for allowing the user to hear audio from the local 911 operator, a microphone in the casing for allowing the user to speak directly to the local 911 operator, a rechargeable battery in the casing for providing power to the transmitter, speaker and microphone, a GPS (global positioning satellite) module in the casing, an attachment opening in the casing to allow the device to be attached to one of: a lanyard, a belt clip, and garment clip, and an actuation mode to automatically initiate at least one of a live two-way voice call with the local 911 operator, and send a data and SMS message with GPS location coordinates to a third party when current GPS coordinates of the device pass out of an initial selected zone.

A portable and wearable emergency communication device for a user, can include a handheld waterproof casing for allowing the device to be submersible up to approximately 1 meter underwater, a transmitter inside of the casing for contacting a local 911 operator, a single button switch on the casing activate the transmitter for contacting the local 911 operator, a SIM (Subscriber Identity Module) card module in the casing for storing an international mobile subscriber identity (MSI) number, the SIM card for communicating through a cellular or IOT (internet of things) network, a speaker in the casing for allowing the user to hear audio from the local 911 operator, a microphone in the casing for allowing the user to speak directly to the local 911 operator, a rechargeable battery in the casing for providing power to the transmitter, speaker and microphone, a GPS (global positioning satellite) module in the casing, an attachment opening in the casing to allow the device to be attached to one of: a lanyard, a belt clip, and garment clip, and an actuation mode to automatically initiate at least one of a live two-way voice call with a third party, and send a data and SMS message with GPS location coordinates to the third party, when the device or the user falls down a selected height, or travels outside a selected zone or falls down a selected height.

A portable and wearable emergency communication device for a user, can include a handheld waterproof casing for allowing the device to be submersible up to approximately 1 meter underwater, a transmitter inside of the casing for contacting a local 911 operator, a single button switch on the casing activate the transmitter for contacting the local 911 operator, a SIM (Subscriber Identity Module) card module in the casing for storing an international mobile subscriber identity (MSI) number, the SIM card for communicating through a cellular or IOT (internet of things) network, a speaker in the casing for allowing the user to hear audio from the local 911 operator, a microphone in the casing for allowing the user to speak directly to the local 911 operator, a rechargeable battery in the casing for providing power to the transmitter, speaker and microphone, a GPS (global positioning satellite) module in the casing, an attachment opening in the casing to allow the device to be attached to one of: a lanyard, a belt clip, and garment clip, an actuation mode that includes depressing the button automatically dials the local 911 operator to initiate a two-way call between the user and the local 911 operator, wherein the device instantly connects to the local 911 operator without the device requiring any subscription fees, and without the device requiring any separate subscriber contracts with any third party monitoring service, a second actuation mode with an accelerometer which will automatically initiate both a live two-way voice call with the local 911 operator, and, send a data and SMS message with GPS location coordinates to the local 911 operator, if at least one of the device and the user falls down from a height of approximately 0.5 m, and a third actuation mode to automatically initiate at least one of a live two-way voice call with the local 911 operator, and send a data and SMS message with GPS location coordinates to the local 911 operator when current GPS coordinates of the device pass out of an initial selected zone, or is travelling over a selected speed.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 3 is an upper front right ghost view of the assembled device of FIGS. 1A-1C.

FIG. 6 shows a layout of the electronics modules inside the assembled device of FIGS. 1A-1C.

FIG. 7 is a main flowchart for running the assembled device of FIGS. 1A-1C.

FIG. 8 is a flowchart for running the GPS mode of the main flowchart of FIG. 7.

FIG. 10 is a flowchart to execute command features of the assembled device.

DESCRIPTION OF THE PREFERRED EMBODIMENTS

Figure 1A:
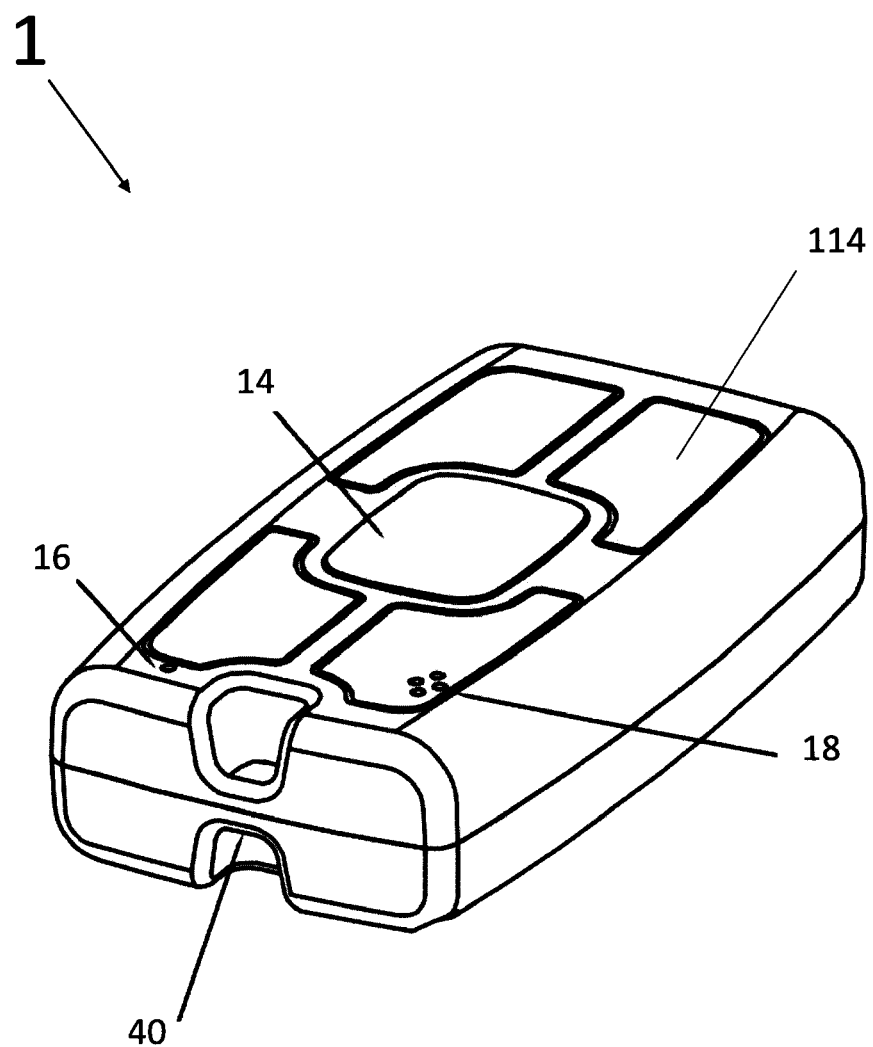
FIG. 1A is an upper front perspective view of the assembled device.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 1B:
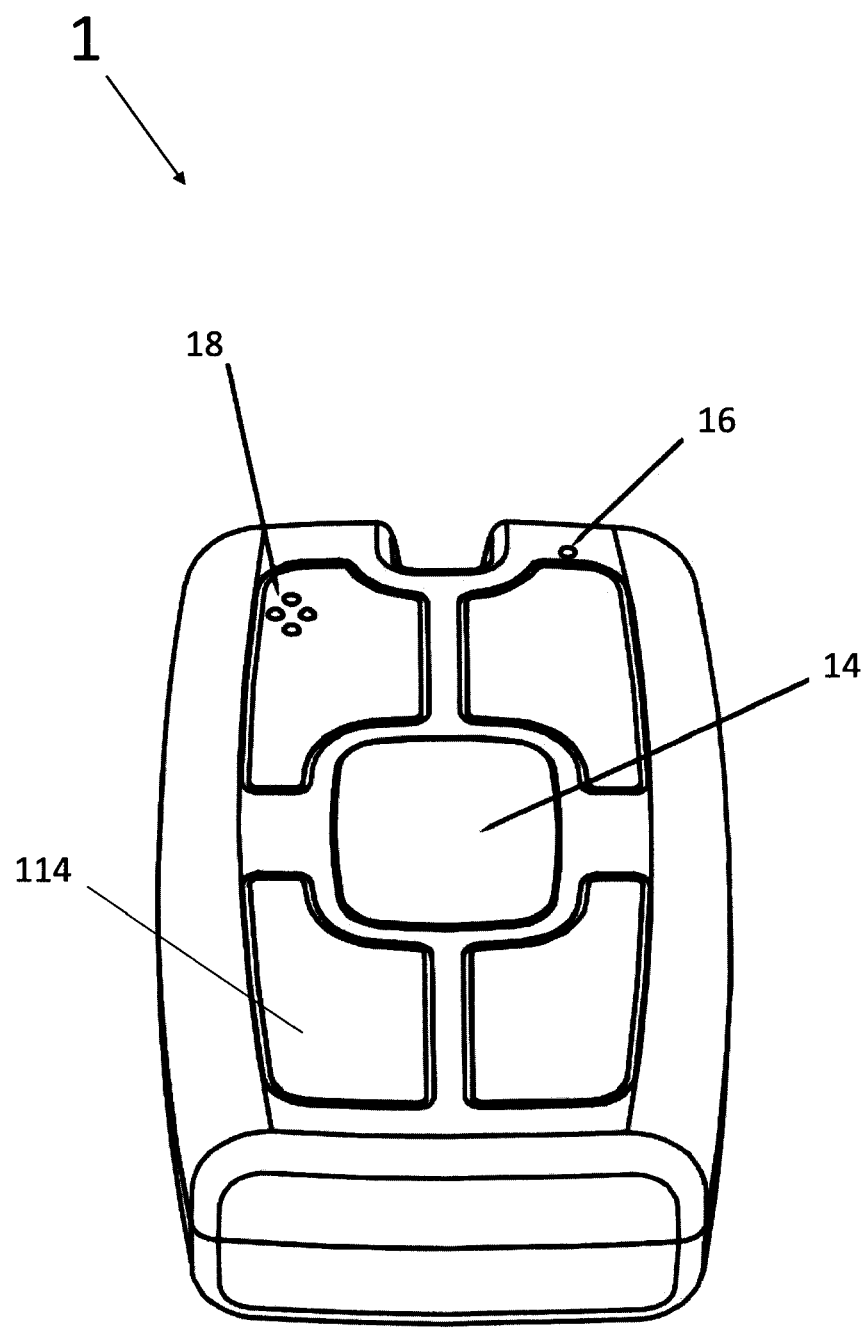
FIG. 1B is an upper rear perspective view of the assembled device of FIG. 1A.
Figure 1C:
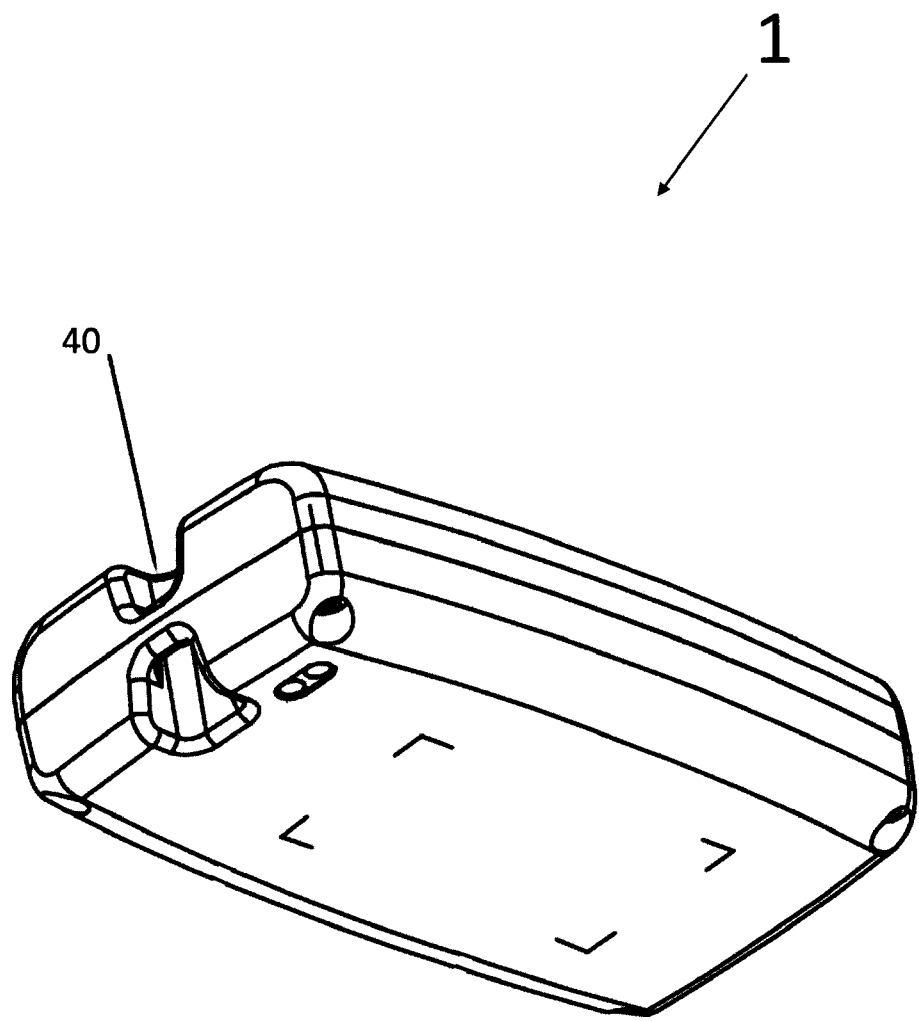
FIG. 1C is a lower front perspective view of the assembled device of FIG. 1A.

A list of components will now be described:
1 assembled device
10 Top half case shell
12 tongue and groove perimeter ridges
14 Button operation switch
16 microphone opening
18 speaker openings
20 bottom half case shell
22 tongue and groove perimeter ridges
30 resilient seal ring (O-ring)
32 first screw
34 second screw
36 third screw
38 fourth screw
40 case attachment opening
50 charging station box (docking station)
52 first side wall
53 first indentation in first side wall
54 second side wall
55 second indentation in second side wall
56 bottom wall
57 indentation in bottom wall
58 top wall
59 indentation in top wall
60 USB port
64 backwall
65 footers on outside of back wall
66 upper set of prongs
68 lower set of prongs
100 electronics modules layout
110 MCU
112 key
114 LED
116 flash
118 G sensor
120 GSM/GPRS/GPS Module
125 antenna
130 SIM card
140 Battery
150 Battery Manager
160 Wireless Charger
170 Audio Power Amplifier
180 SPK (speaker)
190 MIC (microphone)
200 Device Main Flow Diagram
300 Flowchart for running the GPS mode
400 Flowchart for running GSM mode
500 Execute Command Flowchart
510 Press Button
520 Fall down
530 Press Button Twice
540 Low Battery
550 Over Speed
560 Go out/In Fence
570 Movement A description of the acronyms referenced in the application will now be described:
GPS refers to global positioning satellite system
GSM (Global Systems for Mobile Communication). This term used for cellular communications
SMS refers to short message service (cellular phone text messaging)
SOS refers to Mayday or "Send Help"
MIC refers to microphone
SPK refers to speaker FIG. 1A is an upper front perspective view of the assembled device 1 in a generally rectangular casing. FIG. 1B is an upper rear perspective view of the assembled device 1 of FIG. 1A. FIG. 1C is a lower front perspective view of the assembled device 1 of FIG. 1A.

Referring to FIGS. 1A-1C, a preferred embodiment of the device 1 can have a length of approximately 2 to approximately 2½", a width of approximately ¾" to approximately 1¼", and a thickness of approximately ½" to approximately ¾".

The device 1 can be formed from injection molded plastic parts (later described in reference to FIGS. 3, 4A, 4B)

On a front of the device 1 is a depressible button operation switch 14, which when depressed (for approximately 2 to approximately 3 seconds) immediately activates the device 1, a microphone opening 16 and speaker openings 18. The button switch 14 can have a diameter of approximately ⅜ of an inch to be clearly visible to a user.

Along a front side can be a case attachment opening 40 for allowing the device 1 to be attached to one of: a lanyard, a belt clip, and garment clip.

Figure 4A:
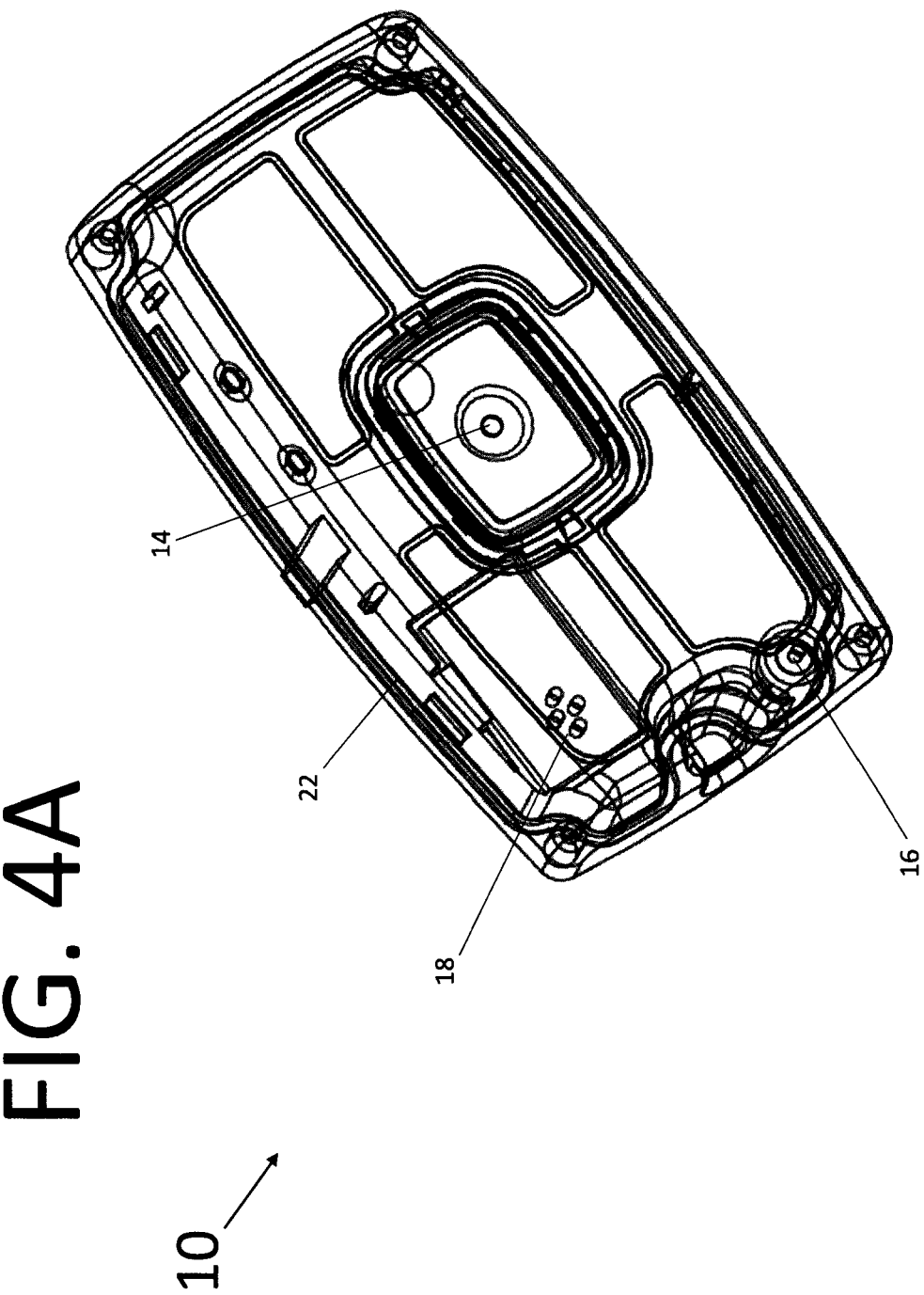
FIG. 4A is an interior view of the top case of the device of FIGS. 1-C.
Figure 4B:
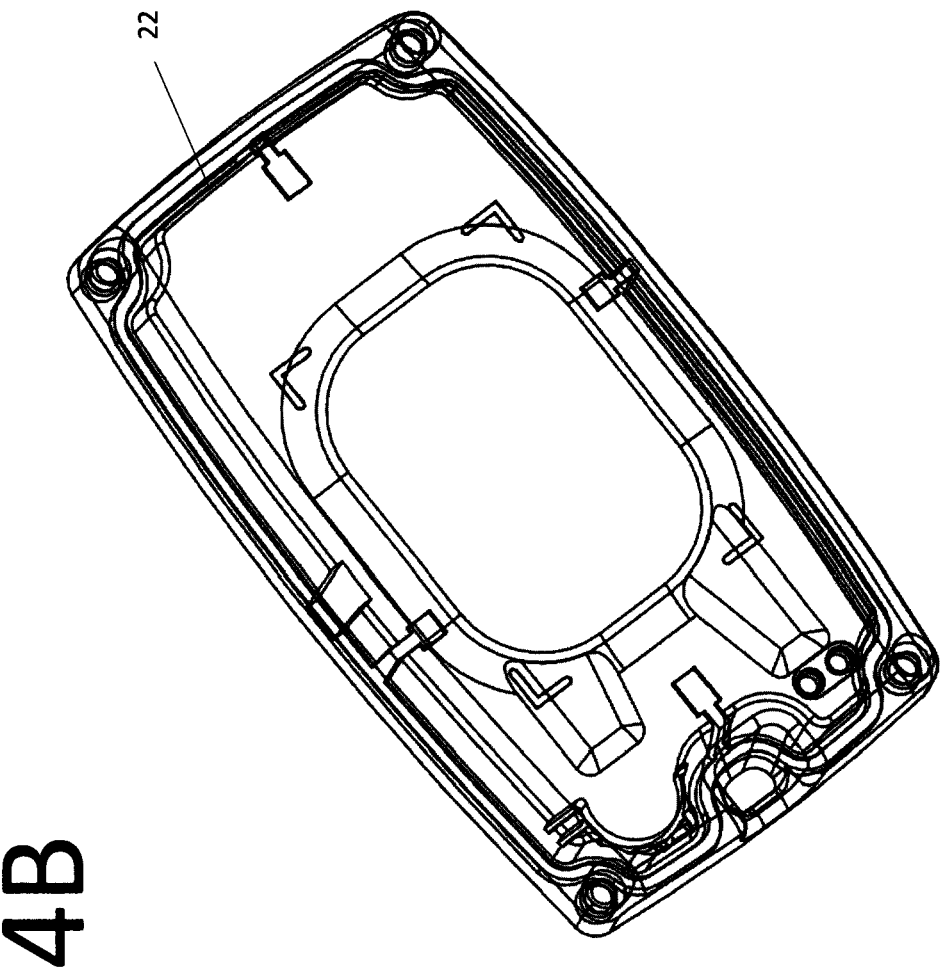
FIG. 4B is an interior view of the bottom case of the device of FIGS. 1-C.

The seal ring 30, such as but not limited to a silicon seal ring can be positioned between the case shells 10, 20 FIGS. 4A, 4B to cause the case to be waterproof up to approximately 1 meter underwater for up to approximately 30 minutes.

Our objective is to obtain a IPX67 rating or higher. Rating will be based on IPX ratings. IPX4 is an IP code, or Ingress Protection Marking. This is a classification standard which rates the degree of protection against intrusion. IP stands for ingress protection. IP ratings are a scale that determines an electrical object's ability of preventing solid or liquid materials from entering the objects. The IP ratings are prescribed by the International Electrotechnical Commission (IEC) of Geneva Switzerland. A 7 rating is the object is protected from temporary water intrusion.

Figure 2A:
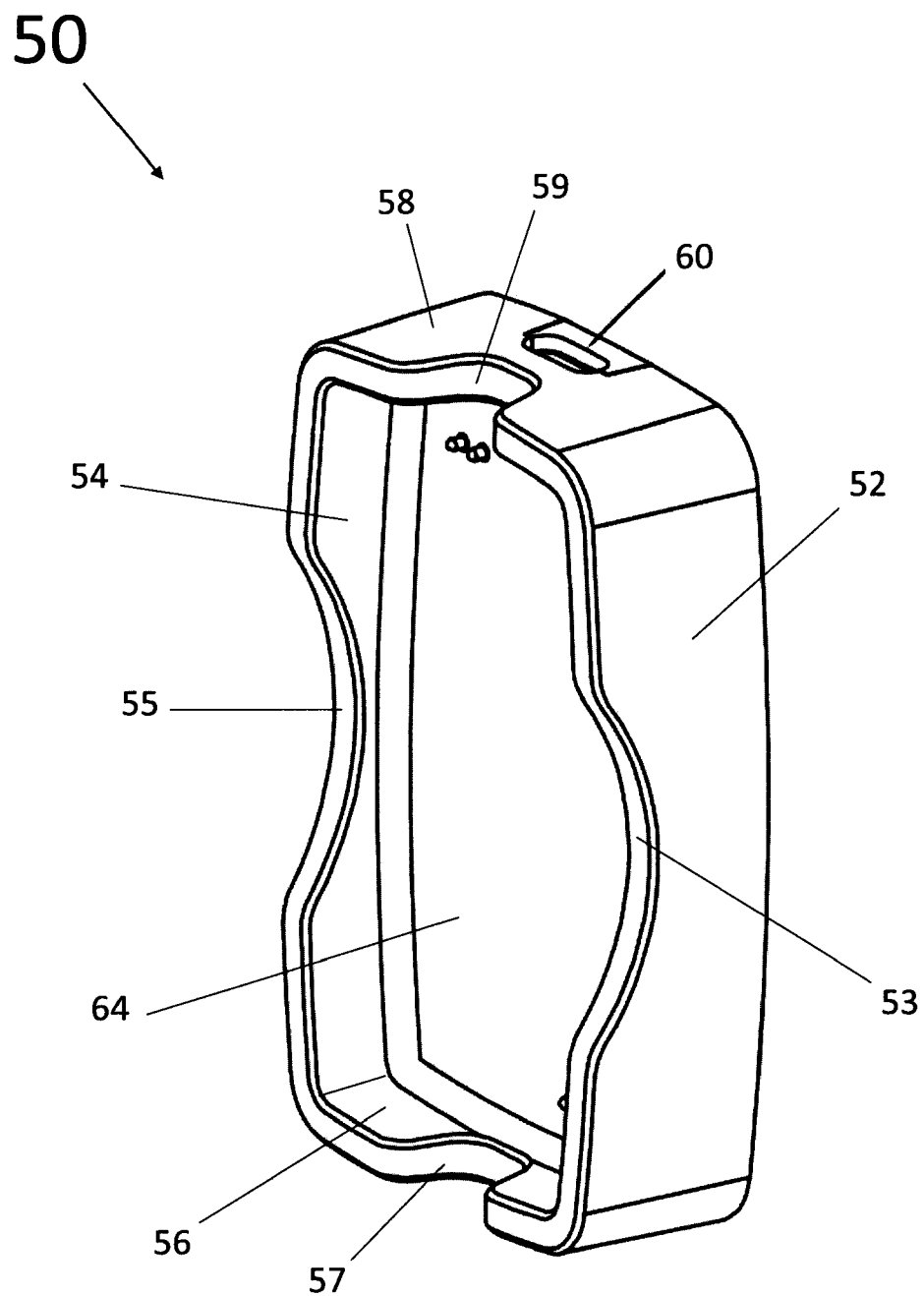
FIG. 2A is an upper front right perspective view of the charging station for the assembled device of FIGS. 1A-1C.
Figure 2B:
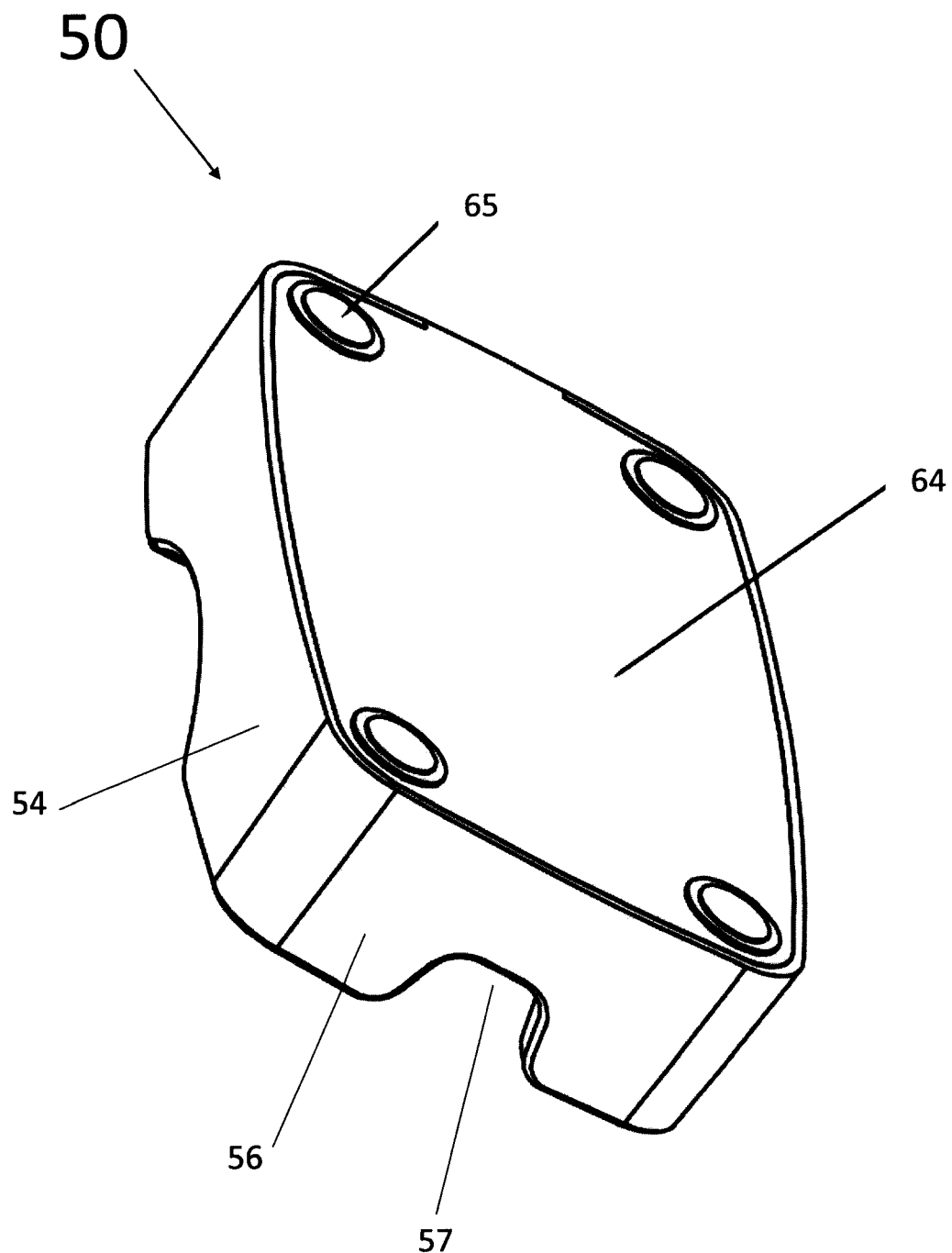
FIG. 2B is a lower rear left perspective view of the charging station of FIG. 2A.
Figure 2C:
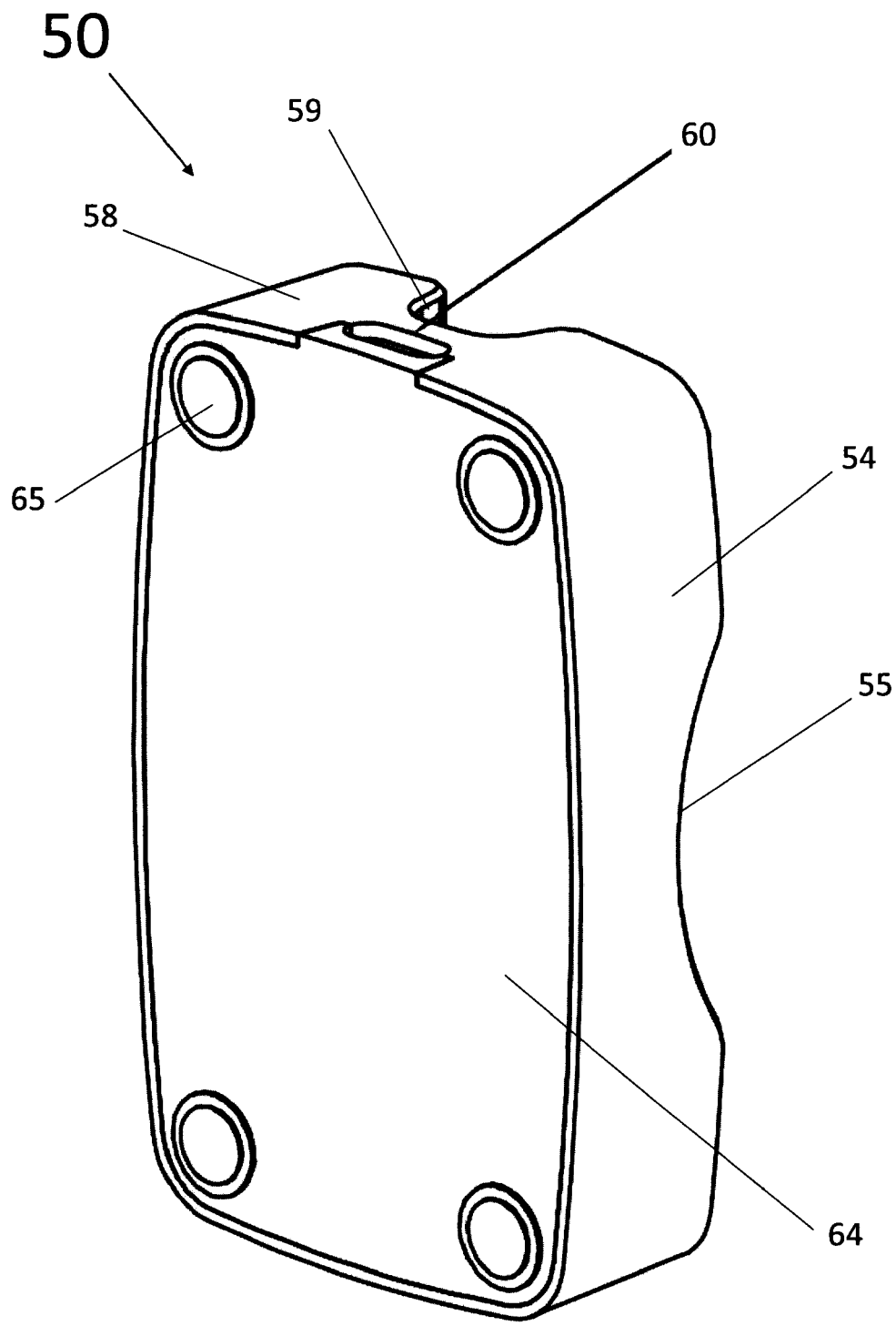
FIG. 2C is an upper rear right perspective view of the charging station of FIG. 2A.

FIG. 2A is an upper front right perspective view of the charging station (docking station) 50 for the assembled device 1 of FIGS. 1A-1C. FIG. 2B is a lower rear left perspective view of the charging station 50 of FIG. 2A. FIG. 2C is an upper rear right perspective view of the charging station 50 of FIG. 2A.

Referring to FIGS. 2A-2C, the charging station 50 can have a box shape with side walls 52, 54, a bottom wall 56 and top wall 580, and back wall 64 forming an opening for allowing the assembled device 1 to be inserted therein. Each of the sidewalls 52, 54, bottom wall 56 and top wall 58 can have indentations 53, 55, 57, 59 to allow the user to be able to grip sides of the assembled device 1 to insert into and pull out of the charging station 50.

Figure 5A:
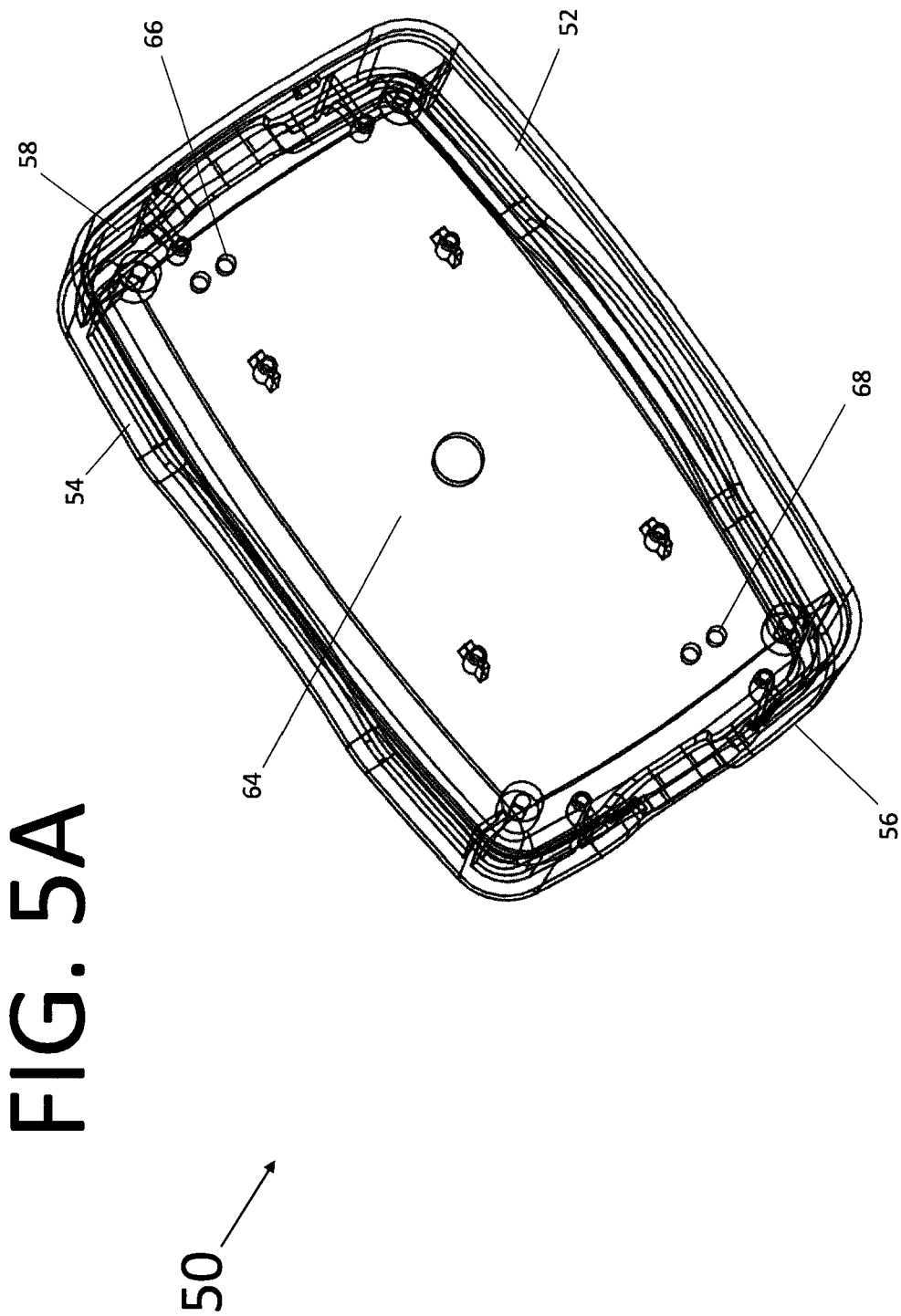
FIG. 5A is a top view of the charging station of FIGS. 2A-3C.
Figure 5B:
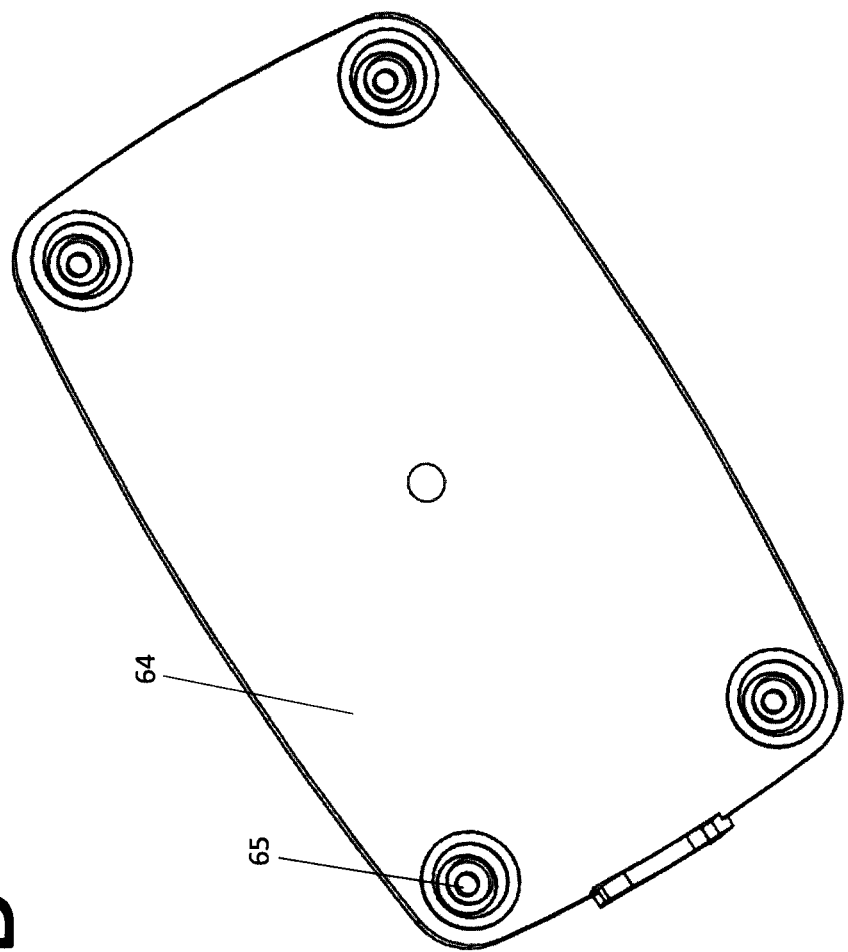
FIG. 5B is a bottom view of the charging station of FIGS. 2A-2C.

The device can be charged in the accompanying charging station shown in FIGS. 5A-5B. There are two contact point on the bottom top right of the case and when placed in the charging station will have contact with docking stations 2 contact points. The charging station has a mini USB plug that can be connected via a cable to a wall outlet. In addition, the device may be charged through wireless charging technology allowing you to lay the charger on a separate wireless charging station and the device will recharge.

Referring to FIGS. 2A-2C, the charging station 50 can be formed from the same materials as the casing parts used in the assembled device 1, and the parts of the charging station 50 are shown and described in FIGS. 5A and 5B.

FIG. 3 is an upper front right ghost view of the assembled device 1 of FIGS. 1A-1C.

FIG. 4A is an interior view of the top case shell 10 of the device 1 of FIGS. 1A-1C. FIG. 4B is an interior view of the bottom case shell 20 of the device of FIGS. 1A-1C.

Referring to FIGS. 1A-1C, 3 and 4A-4B, the device 1 can assembled from a top half case shell 10 with lower facing perimeter having tongue and groove edges 12 which mates to upper facing perimeter tongue and groove edges 22 of a bottom half case shell 20. A resilient ring 30 such as an O-ring, and the like can be located between the mating perimeter edges of the top half case shell and bottom half case shell 20.

A Set of four fasteners, 32, 34, 36, 38 along the corners of the device 1, such as screws can be used to attach (screw together) the top half case shell 10 to the bottom case shell 20. The screws 32, 34, 36, 38 can be plastic, or stainless steel and the like. Additional washers can be used to enhance the capability of the device 1 to be waterproof up to approximately 1 meter.

When the half case shells 10 and 20 are attached to one another along edges 12 and 22, the device 1 is waterproof.

FIG. 5A is a top view of the charging station 50 of FIGS. 2A-3C. FIG. 5B is a bottom view of the charging station 50 of FIGS. 2A-2C.

Referring to FIGS. 2A-2C, 5A and 5B, the inside of the front opening formed from the right wall 52, left wall 54, top wall 58 and bottom wall 56 has a backwall 54, with an upper set of prongs 66 extending into the opening, and a lower set of prongs 68 extending into the opening.

Prongs 66 and 68 are contacts so when the device 1 is placed in the charging station the device will charge regardless of which direction you place it in the charger. On the device there are 2 contacts on the bottom (FIG. 4B) on the bottom right of the Figure there are 2 small circles which identify the devices charging contacts. Both the devices charging contacts and charging stations contacts align so the device can be placed in the charging station and the device will be charged.

FIG. 6 shows an electronics module layout 100 for the electronics modules inside the assembled device 1 of FIGS. 1A-1C and 3.

MCU 110 can be a microprocessor/microcontroller, such as but not limited to Product/Model: STM2FECGCBT6/STM32F072CBT6 work at 8 MHZ Internal Oscillator, KEY 112, in FIG. 6 refers to the activation button switch 14 in FIGS. 1A-1B.

LED 114 in FIG. 6, refers to light emitting diode, such as but not limited to a red LED.

When the battery becomes low the LED red light flashes indicating the device needs to be charged.

The device 1 can have a power light indicator for providing low power supply signals to the user, the low power supply signals are selected from at least one of flashing LED (light emitting diode) light and an audio beep. This feature can be a benefit for elderly users, those hard of hearing and with vision problems.

The audio beep can occur every approximately 2 to approximately 3 minutes until the device 1 is place into the recharging station or is in the process of being recharged.

G-sensor 18 refers to an acceleration sensor/accelerometer, such as but not limited to Product/Model #BMA250/BMA353.

Examples of a G-sensor as an accelerometer connected to a microcomputer in a handheld device is shown and described in U.S. Pat. No. 8,373,658 to Ye et al., and U.S. Pat. No. 8,264,540 to Chang et al., and U.S. Pat. No. 8,408,041 to Ten Kate et al. and U.S. Published Patent Application 2012/0286949 to Worthington et al. which are each incorporated by reference.

GSM/GPRS/GPS Module 120 refers to but is not limited to QUECTEL EG91 ???B2/84/B5/B 12/813.

The Quectel EG91, The EG91-NA is an LTE category 1 module in an LGA package measuring 29.0 mm×25.0 mm×2.3 mm, which meets the 3GPP Release 12 standard. The EG91-NA is pin-to-pin compatible with Quectel's UMTS/HSPA+UG95 and UG96 modules, and LPWA BG95 and BG96 modules, enabling simple, flexible and scalable migration from 2G and 3G to 4G. The EG91-NA is optimized for networks in North America.

The EG91-NA provides cost-effective LTE connectivity, delivering maximum downlink rates of approximately 10 Mbps and uplink rates of approximately 5 Mbps under LTE, is designed using space-efficient surface mounted technology, and features an embedded power management unit for ultra-low deep-sleep current consumption. The module is therefore ideal for size-constrained, low-power IOT applications which are not reliant on high-speed connectivity but do require the longevity and reliability of LTE networks. It is also backward-compatible with existing GSM/GPRS and UMTS/HSPA+ networks, ensuring that it can be connected even in remote areas devoid of 4G network coverage.

A wide range of internet protocols, industry-standard interfaces and functionalities (such as USB serial drivers for Windows 7/8/8.1/10, Linux, and Android) allow the module to serve a wide range of IOT applications including smart metering, wearable devices, environmental monitoring, asset tracking, fleet management, and security systems.

Module 120 can include but is not limited to a Bosch BMA250/DMA253 sensor. the BMA250 is an advanced, ultra-small, triaxial, low-g acceleration sensor with digital interfaces, aiming for low-power consumer electronics applications.

The BMA250 allows measurement of accelerations in 3 perpendicular axes and thus senses tilt, motion, shock and vibration in cellular phones, handhelds, computer peripherals, man-machine interfaces, virtual reality features and game controllers.

GPS (Global Positioning Satellite) signals can be calculated and transmitted remote. See for example, U.S. Pat. No. 5,838,237 to Revell et al., which is incorporated by reference.

SIM CARD module 130 refers to a subscriber identity module or subscriber identification module (SIM), The SIM CARD module 130 is an integrated circuit running a card operating system (COS) that is intended to securely store the international mobile subscriber identity (IMSI) number and its related key, which are used to identify and authenticate subscribers on mobile telephony devices (such as mobile phones. Another way of putting it is: SIM (Subscriber Identity Module) card is a tiny, portable memory chip that stores information about you as a cell phone user. On it, there's a seventeen-digit code that designates its country code of origin, the system carrier (such as AT&T, Verizon, T-Mobile, and the like), and a unique user ID.

Additionally, ESIM can be used where it is programmed into the device.

BATTERY 140 refers to a rechargeable battery, such as but not limited to ABD, Model JP603442 (with UL) 850 mAh.

An example of BATTERY 140 can include but is not limited to L1-ION 850 mAh, and can be increased to 1000 mAh.

BATTERY 140 can be used to supply power to all the other electronic modules shown and described in FIG. 6. The battery contains the power and the Battery Manager 150 ensures the safety of the battery cell.

Battery 140 can also be recharged through Wireless Charger 160.

Battery manager 150 manages the charge/discharge to protect the battery cell.

AUDIO POWER AMPLIFIER 170 can include, but is not limited to a Realtek model ALC5616, which magnifies the sound signal.

SPK 180 refers to an audio speaker, such as but not limited to an RFJ model 1609

MIC 190 refers a microphone, such as but not limited to RFJ model 4015

AN 125 refers to an antenna.

FIG. 7 is a main flowchart 200 for running the assembled device 1 of FIGS. 1A-1C and 3.

FIG. 8 is a flowchart 300 for running the GPS (Global Positioning Satellite) mode of the main flowchart 200 of FIG. 7.

Figure 9:
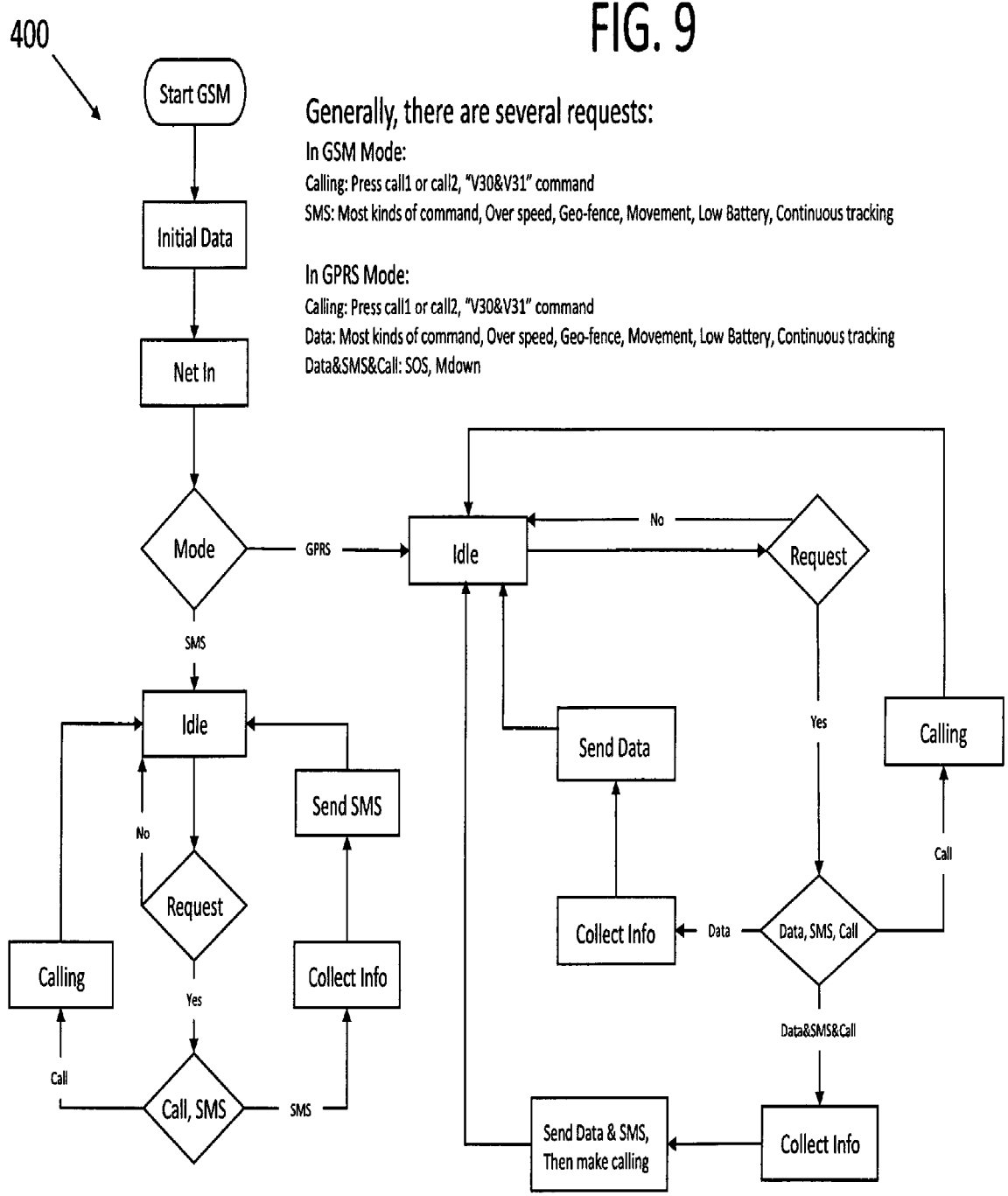
FIG. 9 is a flowchart for running the GMS mode of the main flowchart of FIG. 7.

FIG. 9 is a flowchart 400 for running the GMS mode of the main flowchart 200 of FIG. 7.

FIG. 10 is a flowchart to execute command features 500 of the assembled device 1 shown and described in reference to FIGS. 1A-6.

The execute command features 510-570 are actuation modes that can be used for triggering the initiation of a live 911 phone call from the device 1 to a local 911 operator and/or for other features.

The actuation modes 510-570 can be preprogrammed into the micro-computer 510 shown in FIG. 6 at the factory, and/or the features 510-580 can be updated as noted in the device 1.

Actuation mode 510 is a press button feature which refers to a user physically depressing button 14 on device 1 for at least approximately two to approximately three seconds, which automatically causes the device 1 to dial the local 911 operator for a live two-way phone call between the user and the local 911 operator.

The device 1 can also be programmed to automatically send a data signal and/or SMS (short message) text message which provides the GPS location of the device 1, which includes longitude and latitude coordinates to the local 911 operator.

Actuation mode 510 can also include device 1 to be programmed to for both initiating a live two-way phone and sending a data signal and/or SMS (short message) text message to a 911 emergency operator.

Actuation mode 520 refers a fall down feature which can be separately programmed into device 1, which includes an instance of the user falling down with device 1 or the user drops the device 1.

The measurement and calculation of the fall down feature can be pre-programmed into the device 1 at the factory in the micro-computer 110 FIG. 6 with the g-sensor (accelerometer) 118.

The fall down feature can be pre-programmed to a different height level sensitivity such as but not limited to height levels of approximately 0.4 m, approximately 0.5 m, approximately 0.6 m, approximately 0.7 m, approximately 0.8 m, approximately 0.9 m, approximately 1.0 m, 1.1 m and 1.2 m A preferred programmed setting height can be a height of approximately 0.5 m.

When initiated, Actuation mode 520 causes the device 1 to automatically dial the local 911 operator after the user falls down with device 1 and/or the user drops the device 1.

The device 1 can also be programmed to automatically send a data signal and/or SMS (short message) text message which provides the GPS location of the device 1, which includes longitude and latitude coordinates to the local 911 operator.

Actuation mode 520 can also include programming device 1 for additionally initiating a live two-way phone and/or sending a data signal and/or SMS (short message) 911 emergency operator.

Actuation mode 530 will now be described.

Depressing the button twice in succession sends a data and SMS message with GPS location coordinates to the local 911 operator.

Actuation mode 530 can be a programmed feature that will automatically send a data signal and/or SMS (short message) text message which provides the GPS location of the device 1, which includes longitude and latitude coordinates to the local 911 operator.

Low Battery 540 can be initiated when the battery 140 reaches approximately 10% power reserve. When the device drops to an approximately 10% power reserve the LED 14 (FIG. 6, which is visible on a side of device 1, can start blinking (flashing) and the speaker 180 FIG. 6 can start beeping an audio alarm to the user to use the battery charger 50 in FIGS. 2A-2C.

The LED 14 will stop blinking (flashing) and the beeping can stop when the battery 140 has been placed back into the recharging station or is being recharged by the wireless charger.

Over Speed 550 refers to a feature for reprogramming microcomputer/microcontroller 110 by adjust the G-sensor (accelerometer) 118 to automatically initiate both a live two-way voice call with a third party, and/or, send a data and SMS text message with GPS location coordinates to the third party, if the device is travelling over a selected speed, For example, the device 1 can initiate a live two-way voice call with a third party, and/or, send a data and SMS text message with GPS location coordinates to the third party if the device 1 is travelling over approximately 70 mph. For example, the third party can be a parent or guardian of a user such as a driver under the age of approximately 21 years old.

Over Speed 550 can also include a future model with a possible subscriber service for young users under age 21 so parents/guardians can monitor the user.

Go out/in Fence 560 refers to the GPS coordinates of the device 1 to start an actuation mode when the device becomes moved to a new location from a preprogrammed location. For example, the device 1 can be programmed to initiate a live 911 call with a local 911 operator and/or send a data and SMS text message with GPS location coordinates to the local 911 operator if the device 1 moves out of a selected geographic zone. For example, if the GSP coordinates of the device 1 reach more than approximately ¼ mile from the initial programmed GPS location, the actuation mode can be initiated.

This feature can be used for a user that has a guardian or parent, where the user is a child, elderly, infirm, and the like.

Movement 570 refers to an actuation mode where there is movement of the device 1 for a selected period of time and the user no longer has GPS. The G-sensor 118 FIG. 6 can sense movement of the device 1

If GPS is no longer working on the device 1, the LED 14 can start flashing (blinking) and/or the speaker 180 FIG. 6 can start an audio beeping.

Referring to FIG. 10, different combinations of actuation modes can be grouped together by reprogramming the microcomputer/microcontroller 110 FIG. 6 through SMS messages with the device 1.

For example, the Fall Down feature 520 and the Over speed feature 550 and/or the Go out/In Fence feature 550 can be used together. Other combinations of the different actuation modes in FIG. 10 can be grouped together.

In addition, the device 1 can include an attachable power cord that can be used to recharge the battery inside.

Additionally, the device can have a separate on and off button for the device.

A separate GSM signal indicator light can be on the device to indicate the global systems mobile. This indicates whether or not there is a GPS signal available or not.

A separate GPS (global positioning system) signal light can be located on the device 1 to indicate that GPS capability is on.

A key fob version can have 2 way direct communication with a 911 operator. The key fob version can have 2 way talk communication with the 911 operator. The key fob version can utilize SIM or eSIM card technology, have GPS or AGPS (Assisted Global Positioning System) chip, fall detection with possible 6 axis and barometric sensor, two way voice (Volte), IP67 (waterproof), wireless charging, 1000 MAH lithium-ion rechargeable battery, Wi-Fi Bluetooth capable.

A 4G/LTE refers to a cellular transmission frequency. GPS (global positioning system) allows the user to immediately communicate their location to the 911 operator that is contacted with the device.

The device allows for the following benefits:
a. Emergencies can't be avoided, but their repercussions can be prevented.
b. Peace of Mind. Knowing you are a touch of a button away from a 911 operator wherever you are.
c. Coverage Wherever You Are
d. GPS offers on-the-go protection.
e. Two-Way Communication with 911
f. No Monthly Charges
g. One time device cost and it's that simple.

This device includes an IP (Ingress Protection) certified rating of Real IP67 Rating which refers to being able to work underwater up to 1 meter of depth for up to approximately 30 minutes.

The invention is referred by the pending trademark 911 DIRECT™ The novel invention is a small portable device which is utilizing SIM, 4G LTE technology and GPS/AGPS modules to contact 911 (Emergency Responder Services) directly with no cell phone contracts or monthly charges. This allows the device owner to be able to reach a local 911 operator no matter where they are as long as there is cellular reception.

When 911 DIRECT is activated (by pressing the center button for approximately 2 seconds to approximately 3 seconds) the consumer will have direct 2-way communication with a 911 operator through the novel device.

In addition, once the call is connected with a 911 operator the device will send a SMS (text message) to 911 with their GPS location. This is done by the installed SIM card pinging GPS to identify location and then transmitted to 911.

The device's case is waterproof and rechargeable. The waterproof feature allows the consumer to shower, tub bath by being able to be submerged without the fear of the device being damaged.

There is such a high number of accidents that happen in the bathroom, the inventor wanted to ensure consumers could take with them wherever they go. The recharging ability allows the consumer the ability to recharge the device and not replace batteries.

There are other devices on the market but when activated they contact a third party "call center" which then directs any caller to either 911 or another destination. These types of devices have a monthly fee attached to them costing consumers hundreds of dollars a year. Many of these units also are either dependent on a home phone base station or a separate cellular device.

The novel device is developed to work independently of home phone, mobile device and offer the consumer a one-time cost (for a period of 3-5 years) with no monthly fees, saving consumers hundreds each year. When emergencies happen, every moment counts which is why the novel device will contact 911 directly saving precious moments.

The novel device can be part of a modified smart phone having a single emergency button on either the front wall, or back wall of the smart phone, where depressing the emergency button can be used with the novel features referenced above.

Additionally, the novel device can be part of a protective case being used with a smart phone, having a single depressible emergency button on either the front wall, or back wall of the smart phone case, where depressing the emergency button can be used with the novel features referenced above.

Further, the device can fit on the back of a smart phone and/or on an outside of a protective case for the smart phone.

While the invention describes examples of accelerometers, other types of accelerometers and gyroscopes can be used.

The device can include an emergency number customized mode with a subscription service, which allows the user and/or the 911 DIRECT service group to identify an emergency contact phone number instead of contacting 911 emergency operator, when using the subscription service.

The device can be customized to contact any number from a local 911 operator to any other defined number. The invention can be customized to any third party number, with the use of a service charge and/or with a subscription service. Additionally, there could be no contract needed for this service.

The subscription service can be a single added fee or monthly fee to be used, as needed.

The SIM card can be used with 3G, 4G, 5G and 6G operation modes, and with satellite communications. This can be used with a physical SIM card or by implementing E-SIM.

The device can have an added feature of a Wi-Fi BLE Beacon (replacing wireless charging). This is only for location purposes not voice. Wi-Fi BLE Beacon allows additional location capabilities inside a structure. The Wi-Fi BLE Beacon utilizes the IP and Mac address from the internet to help pinpoint the location of the device.

While a preferred embodiment includes some dimensions for the device, the actual device can be smaller, as needed. Additionally, the device can be sized to that of a pendant, to be worn on a chain, and/or on a wrist, and the like.

The term "approximately" "/" approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps.

Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A portable and wearable emergency communication device for a user, comprising:
   a handheld waterproof casing for allowing the device to be submersible up to approximately 1 meter underwater, and up to 30 minutes submerged;
   a transmitter inside of the casing for contacting a local 911 operator;
   a single button switch on the casing activates the transmitter for contacting the local 911 operator;
   a SIM (Subscriber Identity Module) card module in the casing for storing an international mobile subscriber identity (MSI) number, the SIM card for communicating through a cellular or IOT (internet of things) network;
   a speaker in the casing for allowing the user to hear audio from the local 911 operator;
   a microphone for allowing the user to speak directly to the local 911 operator;
   a rechargeable battery for providing power to the transmitter, speaker and microphone;
   a GPS (global positioning satellite) module in the casing for providing location coordinates of the device to the local 911 operator;
   an attachment opening in the casing to allow the device to be attached to one of: a lanyard, a belt clip, and/or garment clip or another accessory; and
   an actuation mode that includes depressing the button automatically dials the local 911 operator to initiate a two-way call between the user and the local 911 operator, wherein the device instantly connects to the local 911 operator; and another actuation mode to contact a third party by at least one of phone or text message, if at least one of the device, and the user is travelling over a selected speed.

2. A portable and wearable emergency communication device for a user, comprising:
   a handheld waterproof casing for allowing the device to be submersible up to approximately 1 meter underwater, and up to 30 minutes submerged;
   a transmitter inside of the casing for contacting a local 911 operator;
   a single button switch on the casing activates the transmitter for contacting the local 911 operator;
   a SIM (Subscriber Identity Module) card module in the casing for storing an international mobile subscriber identity (MSI) number, the SIM card for communicating through a cellular or IOT (internet of things) network;
   a speaker in the casing for allowing the user to hear audio from the local 911 operator;
   a microphone for allowing the user to speak directly to the local 911 operator;
   a rechargeable battery for providing power to the transmitter, speaker and microphone;
   a GPS (global positioning satellite) module in the casing for providing location coordinates of the device to the local 911 operator;
   an attachment opening in the casing to allow the device to be attached to one of: a lanyard, a belt clip, and/or garment clip or another accessory; and
   an actuation mode that includes depressing the button automatically dials the local 911 operator to initiate a two-way call between the user and the local 911 operator, wherein the device instantly connects to the local 911 operator; and
   another actuation mode to contact a third party by at least one of phone or text message, if at least one of the device, and the user is travels outside a selected zone.

3. A portable and wearable emergency communication device for a user, comprising:
   a handheld waterproof casing for allowing the device to be submersible up to approximately 1 meter underwater;
   a transmitter inside of the casing for contacting a local 911 operator;
   a single button switch on the casing activates the transmitter for contacting the local 911 operator;
   a SIM (Subscriber Identity Module) card module in the casing for storing an international mobile subscriber identity (MSI) number, the SIM card for communicating through a cellular or IOT (internet of things) network;
   a speaker in the casing for allowing the user to hear audio from the local 911 operator;
   a microphone in the casing for allowing the user to speak directly to the local 911 operator;

a rechargeable battery in the casing for providing power to the transmitter, speaker and microphone;

a GPS (global positioning satellite) module in the casing;

an attachment opening in the casing to allow the device to be attached to one of: a lanyard, a belt clip, and garment clip; and an actuation mode that includes depressing the button automatically dials the local 911 operator to initiate a two-way call between the user and the local 911 operator, wherein the device instantly connects to the local 911 operator without the device requiring any subscription fees, and without the device requiring any separate subscriber contracts with any third party monitoring service;

a second actuation mode with an accelerometer which will automatically initiate both a live two-way voice call with the local 911 operator, and, send a data and SMS message with GPS location coordinates to the local 911 operator, if at least one of the device and the user falls down from a height of approximately 0.5 m; and a third actuation mode to automatically initiate at least one of a live two-way voice call with the local 911 operator, and send a data and SMS message with GPS location coordinates to the local 911 operator when current GPS coordinates of the device pass out of an initial selected zone, or is travelling over a selected speed.

* * * * *